United States Patent Office 2,947,739
Patented Aug. 2, 1960

2,947,739
PROCESS FOR THE HYDROGENATION OF LIGNIN AND LIGNOCELLULOSIC MATERIALS

Franco Gaslini, Via Veniero 14, Milan, Italy

No Drawing. Filed June 9, 1958, Ser. No. 740,523

Claims priority, application Italy Mar. 7, 1958

6 Claims. (Cl. 260—134)

This invention relates to a process for the hydrogenation of lignocellulosic materials from wood and other plant materials, with the simultaneous separation of cellulose from non-cellulosic and hemicellulosic components.

An object of this invention is to recover the non-cellulosic components of wood in the form of compounds useful as intermediates for organic synthesis or as monomers for the production of modified phenolic resins.

Another object of this invention is to produce pulp or cellulose with the simultaneous conversion of the non-cellulosic and hemicellulosic materials into hydrogenated products that may be easily separated from the pulp.

Still another object of this invention is the conversion of the lignin (in the native state or previously isolated) into useful hydrogenated products.

Many attempts have been made in the past for separating the cellulose from the other components of the wood by means of hydrogenation. The processes heretofore known require the adoption of very drastic temperatures; consequently the lignocellulosic material is greatly modified through the hydrogenating treatment. As hydrogenation catalysts there were suggested for instance Ni-Raney or other finely divided metals, metal sulphides etc. The hydrogenation was performed in organic and aqueous solvents at temperatures generally above 200° C. and often near to 300° C.

A general feature of the hydrogenation processes of lignocellulosic materials, as heretofore known, is to employ catalysts in suspension to hydrogenate a material which in its turn is undissolved. This involves the need for employing simultaneously reagents, usually inorganic ones, capable by themselves to produce a preliminary chemical attack on the lignocellulosic material. The caustic alkalis are the reagents most frequently used for this purpose.

The hydrogenating processes using suspended catalysts require the use of reaction temperatures so high as to produce a breaking-up or modification of the structure initially existing in the wood, through depolymerisation, hydrolysis, alcoholysis, pyrolysis etc.

Such modifications involve serious disadvantages. On one side they degrade the cellulosic fraction, with the consequent reduction of the pulp yields, and on the other side the uncontrolled hydrogenation of the aromatic nucleus reduces the yields in valuable phenolic products.

The use of caustic alkalis, such as for instance NaOH, at high temperatures, in metallic high pressure apparatus, is an economic disadvantage because of the corrosive action of the alkalis on the metal at high temperatures.

The purpose of the present invention is to make feasible the hydrogenation reaction at lower temperatures than those mentioned above. This is possible by means of hydrogenation catalysts which, being soluble and actually dissolved in the solvent medium, can easily penetrate all the wood fibers and consequently facilitate the hydrogenolysis of the bonds between the cellulose and the other components of the wood etc.

For this purpose, there are employed as selective hydrogenation catalysts, metal carbonyl; such as for instance cobalt carbonyl and iron carbonyl, or compounds containing cobalt and/or iron in a form capable of being transformed, at least partially, in metal carbonyls. Examples of the metal compounds capable of forming carbonyls under pressure of carbon monoxide and hydrogen are cobalt hydroxides, cobalt carbonates, cobalt salts of organic acids, and organic cobalt complexes. The hydrogenation is carried out in a liquid phase, using mixtures of carbon monoxide and hydrogen, preferably with a large excess of hydrogen, at an overall pressure above 50 atm. and at temperatures between 35° C. and 200° C.

In the hydrogenation process constituting the object of the present invention, no reagent able to react preventively with the lignocellulosic material is needed. For the practical realisation the following solvents are suitable:

(1) Hydrocarbons of any class, having critical temperatures above 130° C. except those containing olefinic double bonds. In particular the aromatic hydrocarbons or light and medium petroleum distillates having a very low olefinic content are suitable.

(2) Saturated compounds, containing ethereal bonds, such as aliphatic and cyclic ethers (as for instance ethyl ether, tetrahydrofuran, dioxan, dimethyl ethers of the ethylene and diethylene glycols).

Generally speaking, the organic compounds constituted by C, H and O, of any class, provided they react with difficulty with the reaction mixture, may be used as solvents, ketones, such as acetone or the most common methyl alkyl ketones, and the primary saturated alcohols (except methanol) can be used at temperatures below 160° C.

The time of reaction depends upon the reaction conditions and upon the material which is subjected to reaction. Thus for instance, the hydrogenation of a lignin previously separated from the wood, such as for instance the thiolignin, requires a very short reaction time, as for instance 1 to 2 hours at 200° C. or 5 to 8 hours at 120° C. If instead lignin in native state is hydrogenated, as for instance in the delignification of chips or of wood flour in order to produce pulp suitable for the production of paper, or a cellulose suitable for chemical applications, it is usually preferable to treat the original lignocellulosic material for long period of time such as 6 to 24 hours at 100° C. to 180° C.

The hydrogenation process may be performed by batch technique or continuously. In order to better illustrate the nature and possibility of the present invention the following examples may help:

EXAMPLE 1

30 g. of dried spruce chips with the average dimensions of 2 x 2 x 1 cm.$^3$ are placed in a 500 cu. cm. oscillating autoclave with a 3 percent solution of dicobalt octacarbonyl in ethyl ether. A mixture of CO and $H_2$ (1:6 ratio) is introduced at substantially 160 atm. at 15° C., and the autoclave is heated for 8 hours at 135° C. to 150° C.

After cooling an ethereal solution is recovered containing the hydrogenation products and most of the catalysts. The solid residue is washed several times with ether to recover the catalyst.

23 g. of dried residue chips are obtained which, though maintaining their initial shape, crumble down in fibers merely upon shaking. The fibers are cellulose of a satisfactory purity.

The ethereal extract is concentrated and can be reutilized for several successive hydrogenations before being subjected to the extraction of the phenolic products.

EXAMPLE 2

In the following table are tabulated the results obtained, depending upon the operation variables, by hydrogenation of spruce wood flour.

*Table 1*

HYDROGENATION OF 100 G. OF WOOD FLOUR WITH A 2 PERCENT SOLUTION OF DICOBALT OCTACARBONYL IN DIFFERENT SOLVENTS, AND AT PRESSURES RANGING FROM 150 TO 400 ATM.

| Operating variables, Solvent | Temperatures | Time, hours | Undissolved residue | | Acid phenols, g. | Dissolved products, Neutral products, g. |
|---|---|---|---|---|---|---|
| | | | Cellulose, g. | Lignin in the cell, percent | | |
| Ethyl Ether | 130 | 12 | 72 | 3 | 20 | 10 |
| Do | 150 | 8 | 53 | 1 | 21 | 20 |
| Dioxane | 140 | 16 | 58 | 3 | 20 | 17 |
| Do | 170 | 12 | 46.5 | 1 | 23 | 25 |
| Ethanol | 130 | 6 | 58 | 2 | 21 | 18 |

EXAMPLE 3

30 g. of spruce thiolignin are placed in a 500 cu. cm. oscillating autoclave with a 2 percent solution of dicobalt octacarbonyl in dioxane. A mixture of CO and $H_2$ (ratio 1:5) is introduced at substantially 190 atm. at 15° C. The autoclave is heated for 6 hours at 150 C. to 160 C. After cooling, the dioxane solution is poured in anhydrous ethyl ether. The precipitate (15 g.) is filtered from the ethereal solution containing the phenolic compounds.

What I claim is:

1. A process for the selective, liquid-phase, catalytic hydrogenation of the noncellulosic components of lignocellulosic materials which comprises suspending a material selected from the group consisting of lignocellulosic materials and lignin in a solvent selected from the group consisting of inert hydrocarbons, ethers, alcoholics, esters, having a metal carbonyl dissolved therein as catalyst, and reacting the resulting suspension with mixtures of carbon monoxide and hydrogen, both in substantial amounts at temperatures up to 200° C. and at a pressure above 50 atmospheres.

2. A process as recited in claim 1 wherein hydrogen in excess is employed with respect to carbon monoxide.

3. A process as recited in claim 1 wherein the temperature is held between 120° and 180° C.

4. A process as recited in claim 1 wherein cellulose is produced.

5. A process as recited in claim 1, wherein the metal carbonyl is a cobalt carbonyl.

6. A process as recited in claim 1, wherein the metal carbonyl is formed in situ from cobalt compounds selected from the group consisting of cobalt hydroxides, cobalt carbonates, cobalt salts of organic acids, and cobalt complexes with organic ligands.

References Cited in the file of this patent

FOREIGN PATENTS 74,258    Sweden _____ Jan. 11, 1928

OTHER REFERENCES

Sidgwick: Chemical Elements and Their Compounds, vol. II, page 1451 (1950 Edition), Oxford University Press, London E.C. 4.

Brauns: The Chemistry of Lignin, page 596 (1952 Edition), Academic Press Inc., New York, N.Y.